United States Patent Office 2,903,451
Patented Sept. 8, 1959

2,903,451
POLYPYRAZOLONE PIGMENTS

Carl Mayn Smith, White Bear Lake, Minn., assignor to General Aniline & Film Corporation, New York, N.Y., a corporation of Delaware No Drawing. Application December 23, 1957
Serial No. 704,236

10 Claims. (Cl. 260—240)

This invention relates to novel polypyrazolone pigments and to methods for producing same. More particularly, the pigments of the instant invention are compounds devoid of sulfonic and carboxylic acid groups having the formula

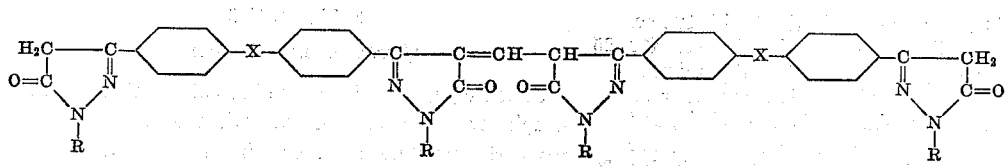

wherein X is selected from the group consisting of O and S; and R is selected from the group consisting of H, lower alkyl, aralkyl and aryl. It has been found that the above described novel compounds comprise a group of oil- and water-insoluble pigments having improved fastness and other properties which render them highly suitable for use in inks, natural and synthetic resins, rubber, paints, lacquers, enamels, and other film-forming compositions, in pigmentation of fibers and films by incorporation into the spinning solutions, in paper and in other common pigment applications.

In the above formula, R may be H, lower alkyl such as methyl, ethyl, butyl, isobutyl, amyl, isoamyl and the like, aralkyl, such as benzyl, and aryl such as phenyl, 1-naphthyl, 2-naphthyl and biphenyl and the like, and inert substituted derivatives thereof. Examples of inert substituents mentioned above include halo such as chloro and bromo, nitro, alkyl such as methyl and ethyl, phenyl and the like.

The compounds of the above formula may be prepared by reacting two molecular equivalents of a bis pyrazolone having the formula

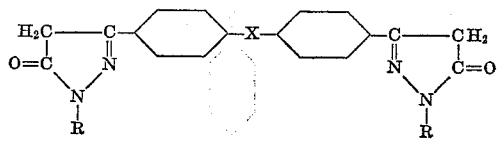

wherein X and R have the values given above, with one molecular equivalent of a methylidyne donor linking agent. The following methods may be employed:

(1) Heating an alkaline solution of the bis pyrazolone with chloroform.

(2) Heating the bis pyrazolone with dialkoxymethyl carboxylate such as diethoxymethyl acetate.

(3) Heating the bis pyrazolone with an ester of orthoformic acid such as ethylorthoformate, preferably in glacial acetic acid.

(4) Heating the bis pyrazolone with formamide.

The above mentioned bis pyrazolones employed as reactants in the above described processes, and their methods of production are disclosed and claimed in my copending application Serial No. 704,318 filed on even date herewith. In general, such bis pyrazolones are made by reaction of one mole of a bis-keto ester of the formula

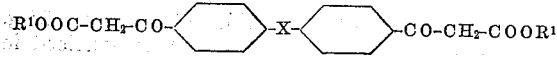

with two moles of a hydrazine of the formula

wherein X and R have the values given above and $R^1$ is lower alkyl such as methyl, ethyl or the like. This reaction to form the bis pyrazolone is carried out at elevated temperatures and may, if desired, be catalyzed with glacial acetic acid or the like, and may be carried out in a solvent or diluent such as ethanol, dioxane or the like, etc.

As some specific examples of bis-keto esters which may be employed in making the bis pyrazolones, there may be mentioned the methyl and ethyl esters of the 4,4'-bisacetic acids derived from diphenyl ether and diphenyl sulfide.

As examples of hydrazines which may be employed in making the bis pyrazolones, there may be mentioned the methyl, ethyl, isobutyl, isoamyl, benzyl, phenyl, p-bromophenyl, biphenyl, o-nitrophenyl, m-nitrophenyl, p-nitrophenyl, picryl, o-tolyl, m-tolyl, p-tolyl, 2,3-xylyl, 1-naphthyl and 2-naphthyl, hydrazines and the like.

The above bis-keto esters may in general be prepared by reacting the appropriate diacid chloride (dicarbonyl chloride) of the corresponding diphenyl ether or diphenylsulfide with methyl or ethyl acetoacetate in cold aqueous alkali in essentially a Schotten-Baumann type procedure, or by diacetylating the diphenyl sulfide by a Friedel-Crafts reaction and then condensing the resulting diketone (diacetyl derivative) with diethyl carbonate.

As is well recognized in the dyestuff and pigment art, improved pigmentary properties are obtained when the initial reactants are as pure as possible. Thus, improved results are obtained when the bis-pyrazolone reactant is first purified, as for example, by recrystallization from an organic solvent such as dichlorobenzene, trichlorobenzene or the like.

Still further improved pigmentary properties are obtained when the above described polypyrazolone pigments of the instant invention are further purified by fractional precipitation in sulfuric acid, comprising dissolving the pigment in concentrated sulfuric acid, diluting with small amounts of water to form a precipitate, presumably the sulfate salt, separating the precipitate by filtration and regenerating the pure pigment by slurrying in water. Optimum results are obtained when this treatment is carried out in a closed vessel or with exclusion of atmospheric humidity. The pigments so obtained are of still further improved brightness, strength and light-fastness.

The pigments of the instant invention may be employed as such or prepared for the market in known manner depending upon the intended use thereof. Thus, a representative paste suitable for use in inks, paints and the like may be made by ball-milling the pigment paste obtained as described hereinabove for a number of hours with 50% of Tamol NNO (sodium salt of sulfonated naphthalene formaldehyde condensate) on the weight of the pigment.

In the following examples, parts are by weight unless otherwise indicated, parts by weight are in grams and parts by volume are in cc. These examples are illus-

EXAMPLE 1

*Preparation of pigment from 1,1'-diphenyl-3,3'-(diphenyl ether-4,4')-5,5'-dipyrazolone*

In a 2 liter flask is charged a ball milled slurry of 25 g. of the above bis pyrazolone (prepared as described in Example 2 of my said copending application) with 200 cc. formamide. 600 cc. additional formamide is used for rinsing the balls and charged to the flask. The mixture is heated as rapidly as possible with a Meeker burner on a tripod to reflux, reflux beginning at about 165° C., and rising to 195° C. The pigment begins separating before all of the bis pyrazolone is in solution. After refluxing for 12 minutes the thickness of the mixture does not increase nor the appearance of the mixture in bulk. It is filtered at the boil on a number 54 Watman paper, washed with hot formamide until the wash is free of color, then washed with acetone. The acetone wash at first is very dark colored and the pigment brightens considerably. When the acetone wash is colorless, the cake is then washed free of acetone with hot water, since a small test shows that the pigment does not dry to a soft powder.

The empirical formula is $C_{61}H_{42}O_6N_8$, M.W. 983.

|  | Calcd. | Found |
| --- | --- | --- |
| Percent C | 74.43 | 74.72 |
| Percent H | 4.31 | 4.22 |
| Percent n | 11.50 | 10.07 |

The pigment has the formula

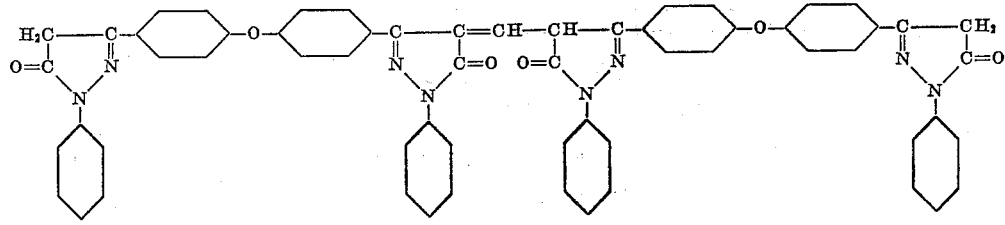

EXAMPLE 2

*Preparation of pigment from 1,1'-diphenyl-3,3'-(diphenyl-sulfide-4,4')-5,5'-dipyrazolone*

A charge of 30 parts by volume glacial acetic acid, 10 parts by weight of the above bis-pyrazolone (prepared as described in Example 6 of my said copending application), and 3.3 parts by volume ethyl orthoformate is heated under agitation at 90° C. for 50 minutes and then at 100° C. for 30 minutes. The yellow pigment is filtered off at room temperature, washed with acetone and dried. It has the structural formula

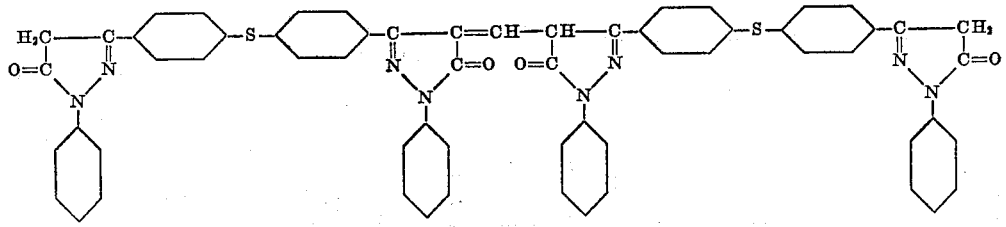

EXAMPLE 3

*Aftertreatment of pigment*

A flask equipped with a cooling bath, a thermometer, an agitator and a calcium chloride tube to prevent atmospheric moisture from entering is charged with 60 parts by volume concentrated sulfuric acid (96%). Under cooling below 25° C. there is added gradually, 6 g. of the pigment prepared as described in Example 1. The charge is stirred for 1 hour to dissolve the pigment. Then under cooling below 25° C. 14.1 parts by volume 50% $H_2SO_4$ is gradually added lowering the acidity to 89% $H_2SO_4$. The charge is agitated for 1 hour. The precipitate is filtered off on a glass sinter funnel and washed with 25 parts by volume 89% $H_2SO_4$. Then the cake is introduced into 300 parts by weight, ice and water, stirred for one half hour, filtered, washed neutral and dried. There is obtained 5.2 parts by weight of a yellow pigment which is brighter than the product of Example 1.

This invention has been disclosed with respect to certain preferred embodiments, and there will become obvious to persons skilled in the art various modifications, equivalents and variations thereof which are intended to be included within the spirit and scope of this invention.

I claim:

1. A compound having the formula

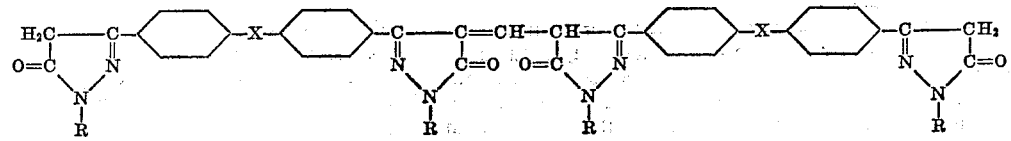

wherein X is selected from the group consisting of O and S; and R is selected from the group consisting of H, lower alkyl, benzyl, phenyl, naphthyl, biphenyl and the halo, nitro and lower alkyl substituted derivatives thereof.

2. The compound of the formula

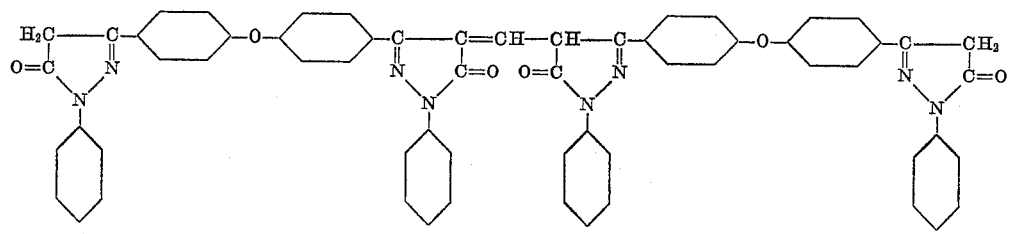

3. The compound of the formula

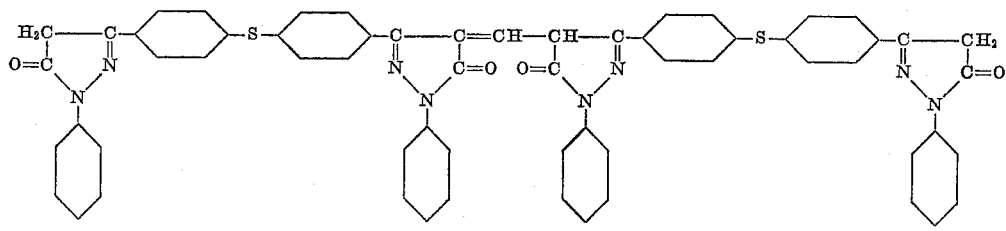

4. A process for producing a compound as defined in claim 1 comprising reacting by heating 2 moles of a bis pyrazolone having the formula

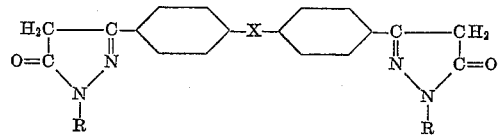

wherein X is selected from the group consisting of O and S; and R is selected from the group consisting of H, lower alkyl, benzyl, phenyl, naphthyl, biphenyl and the halo, nitro and lower alkyl substituted derivatives thereof, with 1 mole of a methylidyne donor linking agent selected from the group consisting of chloroform, dialkoxymethyl carboxylates, orthoformic acid esters, and formamide.

5. A process as defined in claim 4 wherein said agent is ethylorthoformate.

6. A process as defined in claim 4 wherein said agent is formamide.

7. A process for producing a compound as defined in claim 2 comprising reacting by heating 2 moles of 1,1'-diphenyl-3,3'-(diphenylether-4,4') - 5,5' - dipyrazolone with one mole of formamide.

8. A process for producing a compound as defined in claim 2 comprising reacting by heating 2 moles of 1,1'-diphenyl-3,3'-(diphenylether-4,4') - 5,5' - dipyrazolone with one mole of ethyl orthoformate.

9. A process for producing a compound as defined in claim 3 comprising reacting by heating 2 moles of 1,1'-diphenyl-3,3'-(diphenyl sulfide-4,4')-5,5'-dipyrazolone with one mole of ethyl orthoformate.

10. A process as defined in claim 4 followed by purification of the resulting compound by dissolving same in concentrated sulfuric acid and hydrolyzing the resulting sulfate ester of said compound by treatment with water.

References Cited in the file of this patent
UNITED STATES PATENTS
2,533,206  Dent _____ Dec. 12, 1950

OTHER REFERENCES
Ridi et al.: Gazz. Chim. Ital., vol. 83, pp. 36–43 (1953).
Venkataraman: Synthetic Dyes, vol. II, p. 1150 (Academic Press Inc., 1952).